United States Patent [19]
Esu

[11] Patent Number: 5,622,776
[45] Date of Patent: Apr. 22, 1997

[54] COATED GLASS FIBER FOR USE IN EVAPORATIVE COOLER MEDIA AND METHOD OF FORMING SAME

[75] Inventor: Esu S. Esu, Morgantown, W. Va.

[73] Assignee: Hollinee Corporation, Broad Axe, Pa.

[21] Appl. No.: 223,433

[22] Filed: Apr. 5, 1994

Related U.S. Application Data

[62] Division of Ser. No. 72,697, Jun. 7, 1993, Pat. No. 5,340,651, which is a continuation of Ser. No. 777,145, Oct. 16, 1991, abandoned.

[51] Int. Cl.⁶ ..................................................... D04H 1/58
[52] U.S. Cl. ..................... 442/118; 428/426; 428/423.1; 524/834; 524/840
[58] Field of Search .............................. 427/289.8, 244; 156/78, 156, 209, 238, 231, 220, 224.24; 428/288, 290, 425.6; 418/268, 273, 288, 289, 290, 224, 425.6, 426, 423.1, 425.8; 524/834, 840

[56] References Cited

U.S. PATENT DOCUMENTS

| | | |
|---|---|---|
| 2,550,465 | 4/1951 | Gorski ..................................... 524/512 |
| 2,610,893 | 1/1949 | Collins et al. . |
| 3,304,069 | 2/1967 | Palmer, Sr. . |
| 3,458,338 | 7/1969 | Adams et al. . |
| 3,669,638 | 6/1972 | Wong et al. . |
| 3,806,474 | 4/1974 | Blair . |
| 3,895,134 | 7/1975 | Kigane et al. . |
| 3,911,172 | 10/1975 | Van Paesschen et al. . |
| 3,988,157 | 10/1976 | Van Paesschen et al. . |
| 4,001,023 | 1/1977 | Van Paesschen et al. . |
| 4,197,371 | 4/1980 | Holst et al. . |
| 4,252,907 | 2/1981 | Ogasa . |
| 4,258,098 | 3/1981 | Bondo et al. ........................... 524/512 |
| 4,295,871 | 10/1981 | Droux et al. ............................. 524/512 |
| 4,405,325 | 9/1983 | Antlfinger et al. . |
| 4,406,660 | 9/1983 | Beiner et al. . |
| 4,454,187 | 6/1984 | Flowers et al. . |
| 4,506,060 | 3/1985 | White, Sr. et al. ...................... 525/163 |
| 4,556,521 | 12/1985 | Baigas, Jr. . |
| 4,560,612 | 12/1985 | Yau ......................................... 524/512 |
| 4,708,985 | 11/1987 | Diamantoglou et al. . |
| 4,902,449 | 2/1990 | Hobbs . |
| 4,904,522 | 2/1990 | Markusch . |

FOREIGN PATENT DOCUMENTS

| | | |
|---|---|---|
| 2053840 | 4/1971 | France . |
| 0010339 | 1/1979 | Japan .................................... 525/162 |

OTHER PUBLICATIONS

"Material Safety Data Sheet", Southeastern Adhesives Co., MSDS No. 901–10, Oct. 25, 1990 (5 pp.).
"Material Safety Data Sheet", Rohm and Haas Company, Product Code 66670, Sep. 11, 1990 (9 pp.).
"Material Safety Data Sheet", Rohm and Haas Company, Product Code 68871, Nov. 16, 1990 (7 pp.).
Rohm and Hass Company, "Rhoplex TR–407," Jan., 1980.
Rohm and Hass Company, "Rhoplex GL–618," Aug., 1986.
The Condensed Chemical Dictionary, edited by G. Hawley.
Polymer Handbook, J. Brandrup, Third Edition New York, 1989.

*Primary Examiner*—Merrick Dixon
*Attorney, Agent, or Firm*—Reid & Priest

[57] ABSTRACT

Hydrophilic glass fibers are formed by coating glass fibers with a blend of an amine-aldehyde with an acrylic. Evaporative cooler pads are produced by coating glass fibers with a blend of an acrylic and an amine-aldehyde during hot melt spinning of the glass fibers into a web, followed by drawing the web to expand the web or mat into a porous pad, and curing the pad to produce a dimensionally stable, hydrophilic, porous, glass fiber pad. Preferably, the glass fibers are coated with a binding/hydrophilic coating formed of a blend of a urea-formaldehyde with an acrylic. A method for cooling air using the hydrophilic, porous, glass fiber pads, and an improved evaporative cooler utilizing hydrophilic, porous, glass fiber pads is disclosed.

6 Claims, 1 Drawing Sheet

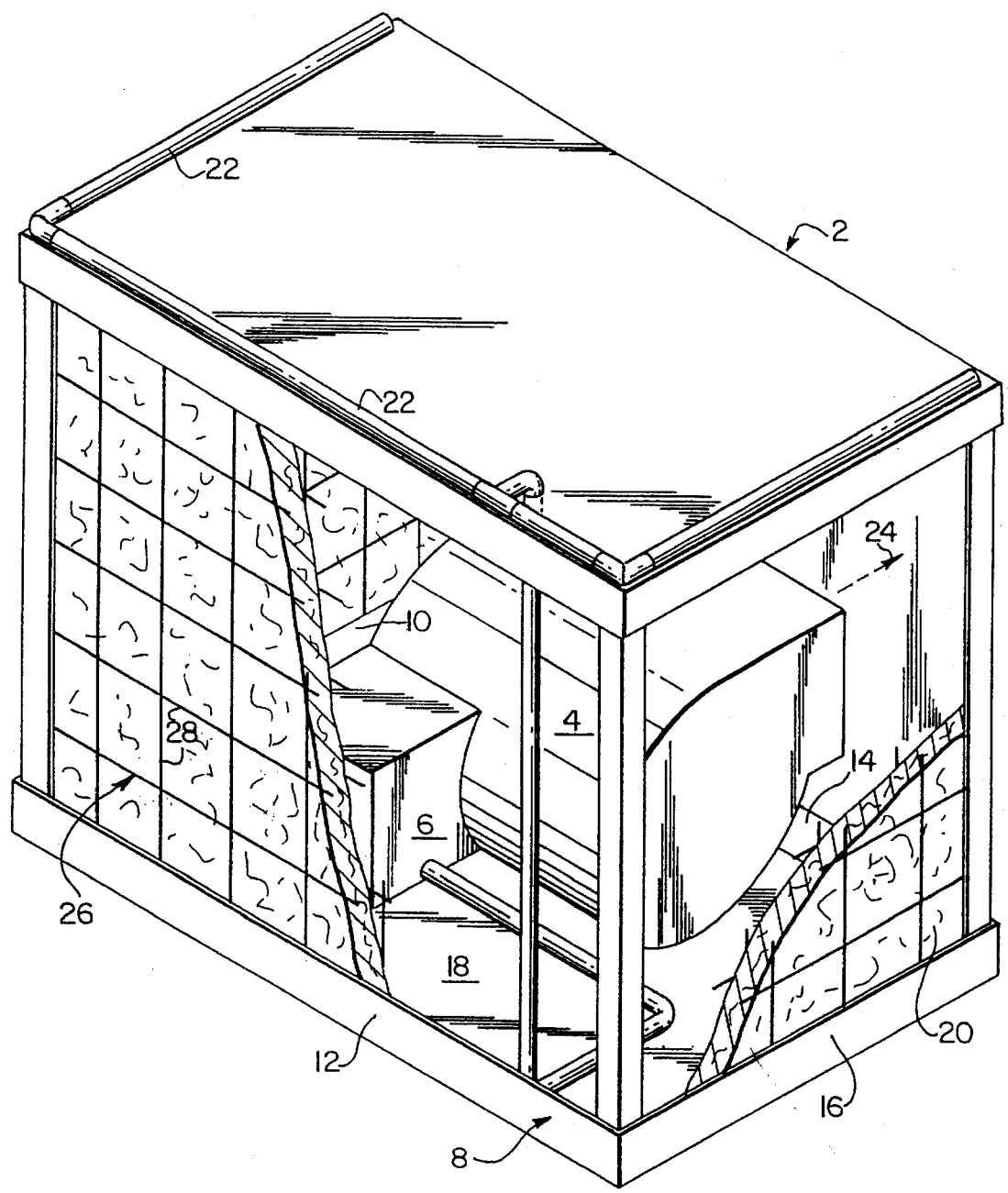

COATED GLASS FIBER FOR USE IN EVAPORATIVE COOLER MEDIA AND METHOD OF FORMING SAME

This application is a Divisional of U.S. patent application Ser. No. 08/072,697, filed Jun. 7, 1993, now U.S. Pat. No. 5,340,651 which is a continuation application of U.S. patent application Ser. No. 07/777,145, filed Oct. 16, 1991, now abandoned.

FIELD OF THE INVENTION

This invention relates generally to evaporative cooler media, methods of forming and using same in an evaporative cooling method and an evaporative cooler apparatus, and relates more particularly to high loft, dimensionally stable glass fiber cooling media formed of glass fiber coated with a hydrophilic coating formed of an amine-aldehyde blended with an acrylic, a method for forming a high loft, dimensionally stable, hydrophilic glass fiber cooling media, and an evaporative cooling apparatus utilizing a hydrophilic glass fiber cooling media.

BACKGROUND OF THE INVENTION

Evaporative cooler media utilize liquid evaporation to cool air by contacting warm air with a liquid, such as water, causing the liquid to evaporate, thereby cooling the air. Evaporative cooler media are especially useful in arid areas having high temperatures and low humidities. Typical evaporative cooling systems include a high volume blower and at least one cooler pad supplied with water. The pads are porous to allow air to flow through, and water is absorbed/adsorbed by the pads or distributed on the pads to increase the surface area available for evaporation, with the blower blowing warm air through the pad to cool the air.

Various materials have been used in the prior art to form the cooler pads used in evaporative coolers. For example, Baigas, Jr., in U.S. Pat. No. 4,556,521, discloses a high loft batt (pad) of hydrophobic textile fibers such as polyester fibers, which are pre-bonded together and then coated with a preformed hydrophilic foam, which coats the bonded synthetic fibers and bridges and spans random portions of the interstices and passageways of the batt to increase the available surface area for contact by water. Preferred foams are formed of vinyl acetate homopolymers and/or polymeric acrylic emulsions.

Hobbs, in U.S. Pat. No. 4,902,449, forms an evaporative cooler pad from natural cellulosic light weight elongate segments, such as aspen wood shavings, which are oriented in generally horizontal planes which extend substantially parallel to the opposing faces of the pad. The cellulosic segments are coated with a hydrophilic foam to provide a coating thickness substantially less than the thickness of the elongate segments. The hydrophilic foam coating and surface has a minute cellular structure which produces a capillary type effect when contacted with water to whisk the water through the pad. All patents and other printed materials referred to herein are incorporated by reference as if reproduced in full hereinbelow. All information concerning chemicals used herein, trademarked or otherwise, is also incorporated by reference, such as but not limited to Material Safety Data Sheets discussing any chemicals mentioned herein.

Generally, evaporative cooler apparatus include an enclosure or housing in which an evaporative cooler pad is positioned so that water can be fed to the pad and air from a blower, located inside or adjacent to the enclosure, can be blown through the pad, thus cooling the air.

Unfortunately, prior art evaporative cooler media and evaporative cooler apparatus using the prior art media suffer from numerous deficiencies. For example, polyester fiber pads, which are formed of fibers coated with a hydrophilic coating, have too low a porosity and rapidly become clogged with dirt. Further, the polyester pads do not have sufficient dimensional stability or rigidity, and hence need greater reinforcement, such as by use of a reinforcement grid in the evaporative cooler apparatus housing. After several months of contact with water, the polyester fiber pads degenerate, and water causes them to collapse under their own weight if they are not replaced soon enough.

Prior art evaporative cooling pads formed from wood shavings also suffer from bacterial and fungal growth due to microorganisms carried by air circulated through the pads, which results in the pads giving off objectionable odors; further, bacterial action degrades the organic matter, causing the pads to sag, thus loosing the desired porosity for air passage, and reducing the surface area available for evaporation.

As the porosity of evaporative cooler pads decreases or as cooler pads become clogged in evaporative coolers, greater strain is placed on the blowers which draw or blow air through the cooler media; this results in increased energy consumption, increased wear on the blowers, or more frequent replacement of blowers. Therefore, there is a need for an improved evaporative cooling media having improved dimensional stability, high porosity, and high hydrophilicity, yet the media should not be subject to rapid bacterial or fungal decay and should be capable of being produced at a cost comparable to a conventional evaporative cooler media. There is also a need for an improved evaporative cooler apparatus utilizing such an improved cooler media, so that the apparatus will last longer and be more efficient in cooling, and yet require less frequent pad replacement.

To overcome some of these shortcomings, attempts were made to produce evaporative cooler media from inert inorganic or mineral fibers, such as those made of silica, and in particular, attempts were undertaken to form evaporative cooler media from fiber glass. Fiber glass mats are produced by melting glass to form long thin fibers and then winding of the fibers on a drum to form a mat. (This is known as hot melt spinning.) The mats are subsequently pulled or drawn to expand the mats into porous pads. Since prior art cooler pads had been produced by coating polyester fibers with an acrylic emulsion (otherwise known as an acrylic, acrylic polymer mixture, acrylic polymer blend, acrylic latex, latex, or acrylic resin), glass fibers were coated with an acrylic resin in an attempt to produce a hydrophilic, porous, glass fiber cooler media. However, the acrylic resin coating jelled onto the fibers in the glass fiber mat, and the glass fiber mats would not expand well into a pad (hence the resulting pads had zero or almost zero porosity).

Porous fiber glass pads are known, and are generally used as air filters. In order to form expanded, dimensionally stable high loft fiber glass pads from mats, the glass fibers are often coated with a binder during spinning, such as a urea-formaldehyde blend (otherwise known as urea-formaldehyde copolymer, UF, or urea-formaldehyde); however, binders such as urea-formaldehyde co-polymers degrade in water. Hence, such urea-formaldehyde bonded pads could not be used as evaporative cooler media, since the water would rapidly degrade the urea-formaldehyde which binds the fibers into a 3-dimensional porous matrix. Thus, early experiments failed to produce a hydrophilic glass fiber or hydrophilic glass fiber pads. (See U.S. Pat. No. 4,904,522 for binding of glass fiber mats with aqueous polyisocyanate emulsions for more information on glass fiber binding.)

Nevertheless, if a hydrophilic glass fiber could be produced and formed into a dimensionally stable porous pad, such pads would be highly useful in evaporative coolers and for other filtration purposes.

Therefore, it is a primary object of the present invention to produce a hydrophilic glass fiber.

It is a further object of the present invention to produce a dimensionally stable porous glass fiber pad having hydrophilic properties.

It is yet another object of the present invention to develop a method for forming hydrophilic glass fibers and dimensionally stable porous glass fiber pads having hydrophilic properties.

It is still yet another object of the present invention to provide an evaporative cooler apparatus utilizing a hydrophilic glass fiber cooling media.

SUMMARY OF THE INVENTION

These and other objects of the present invention are achieved in a preferred embodiment by coating glass fiber with a urea-formaldehyde/acrylic polymer blend. Preferably, the urea-formaldehyde/acrylic polymer blend is applied during spinning of the glass fiber into a mat of intersecting glass fibers. After forming a glass fiber mat, the mat is pulled to add loft so as to form a porous pad, with the arrangement of the fibers in the mat during spinning resulting in a 3 dimensional expansion upon pulling of the mats. The pulled (expanded) mats, "pads," are then cured to form a dimensionally stable, porous, hydrophilic glass fiber pad. (Note that for the purposes of this application, the term pad will refer to the expanded porous structure formed by pulling mats of woven glass fiber.)

An evaporative cooler apparatus is constructed having a housing with means for providing water to at least one porous, hydrophilic glass fiber evaporative cooler pad in the housing. The housing or enclosure is designed so that air can either be drawn through or blown through the evaporative cooler pads; the hydrophilic coating on the glass fibers in the evaporative cooler pad of the present invention distributes water throughout the cooler pad, and, since the glass fiber pads are highly porous and have improved dimensional stability, there is less resistance to air flow through the pad than with prior art cooler pads, resulting in an evaporative cooler apparatus which requires less frequent pad replacement and having lower wear or stress on the blower.

BRIEF DESCRIPTION OF THE DRAWINGS

FIG. 1 is a perspective view of an evaporative cooler apparatus utilizing a porous, hydrophilic, glass fiber evaporative cooler pad produced in accordance with the present invention.

DETAILED DESCRIPTION OF THE PREFERRED EMBODIMENTS

With reference to FIG. 1, the general design of an evaporative cooler apparatus is presented. An enclosure or housing 2 contains a blower 4, which can be driven by an electric motor located inside of enclosure 2, or which can be driven by a belt operated by mechanical, electrical, or other means located outside of housing 2. A pump 6 is also optionally located inside enclosure 2 to supply water to well 8 formed in the bottom of enclosure 2 by short sidewalls 10, 12, 14, 16, and bottom 18. In the alternative, water or another evaporative fluid can be supplied to well 8 via any suitable means. Pads 20 are situated in housing 2 so that water in well 8 will contact the pads and the pads will wick water out of the reservoir 8 via the hydrophilic coating on the glass fiber. Preferably, water is also allowed to flow through the pads via pipes 22 situated above the tops of the pads, which have perforations along the bottom surface to allow water to drain into/onto pads 20.

If blower 4 is operated to draw air into housing 2, a concentrated stream of cooler air, represented by arrow 24, will be produced. If air is blow into enclosure 2, a dispersed stream of cooler air will exit through the hydrophilic pads 20 resting in the walls of enclosure 2.

A conventional grid 26, preferably formed of a material which is not easily attacked by water, is provided to reinforce the cooler pads and prevent their buckling or collapsing toward the interior or exterior of enclosure 2 upon operation of blower 4. Note that pads 20 can be loosely rested in housing 2, or retained by any conventional means. Due to the improved dimensional stability of the pads produced in accordance with the present invention, grid 26 can have the number of reinforcement structures 28 reduced and, in some cases, grid 26 can be dispensed with entirely, thus resulting in substantial cost savings and effort in producing the apparatus.

A preferred non-limiting embodiment of a hydrophilic glass fiber and porous, hydrophilic, glass fiber evaporative cooler pad follows. Glass fiber is produced by melting glass and spinning the glass to produce a glass fiber (or fiber glass) mat following conventional glass fiber spinning techniques. During spinning of the glass mat, the fibers are sprayed with a binding mixture containing a urea-formaldehyde/acrylic blend. The drums upon which the glass fibers are spun are preferably covered with cellophane prior to spinning the glass fibers onto the drum. After hot melt spinning of glass fibers onto the drums, the glass fiber-coated drums are covered with cellophane, and the glass fiber webs on the drums are cut in a direction parallel with the axis of each drum. This produces rectangular or square glass fiber mats. Each mat is then pulled to add loft, with the arrangement of the fibers on the mat resulting in a 3 dimensional expansion of the mat into a porous pad upon pulling of the mat. The pads are then heated to cure the binder coating, resulting in a dimensionally stable, porous pad having a hydrophilic coating.

With the exception of its hydrophobicity, fiber (or fibre) glass appears to be an ideal media for air filtration pads or cooling media pads in evaporative coolers, since the fibers have no appreciable $H_2O$ solubility and have high rigidity. The high rigidity enables highly porous, yet dimensionally stable pads to be formed.

Glass to produce the glass pads can be obtained from a variety of sources, including recycled glass, and scrap glass from a variety of manufacturers. Preferred acrylic resins can be obtained from Rohm and Haas Specialty Industrial Polymers of Edison, N.J., 08837, and are sold under the tradenames RHOPLEX GL-618 and RHOPLEX TR-407. Similar acrylic polymer resin products can also be purchased from Air Products and Chemicals, Allentown, Pa. 18195, such as the resin sold under the tradename FLEXBOND 984 EMULSION, or a suitable acrylic resin can be purchased from BF Goodrich, Specialty Polymers and Chemicals Division, Rexville, Ohio 44141. Other sources of acrylic resins or emulsions can be used, or one of skill in the art may produce their own formulation, provided the necessary degree of hydrophilicity can be produced in the glass fiber pads without interfering with the dimensionally stability of the pads (i.e., the hydrophilic coating/binder should have high wet strength).

A suitable urea-formaldehyde resin or co-polymer blend can be obtained from Seaco (Southeastern Adhesive Company) of Ridgewell, Va., designated resin product 4067.1. The preceding materials and suppliers are merely preferred, and other suppliers and equivalent ingredients may be used in performing the invention.

Due to the failure of early experiments which attempted to apply an acrylic polymer coating to glass fibers and form an expanded hydrophilic pad, it was desirable to find a composition or combination of compositions which would (1) sufficiently bind glass fibers together to form a dimensionally stable porous fiber glass pad which could withstand degradation by contact with aqueous solutions, and (2) provide a suitable hydrophilic coating on the glass fibers to provide a large area for liquid air contact. Thus, experiments were performed in an attempt to formulate a suitable hydrophilic binder composition, and to develop a method of producing a hydrophilic coated glass fiber and a porous, dimensionally stable, hydrophilic glass fiber pad.

EXPERIMENT 1

A 50—50 mix of an acrylic polymer with a urea-formaldehyde co-polymer was applied to glass fibers during hot melt spinning of the glass fibers onto a drum covered with cellophane. The spun mat of intersecting glass fibers on the drum was subsequently covered with another sheet of cellophane, and the mat removed from the drum by cutting parallel to the axis of the drum. The mat was then pulled to create loft (and increase porosity), and the pad formed conveyed at a rate of 110 feet per minute into a 110 foot long oven held at 460° F. (this gives about a 1 minute cure time). However, the pads stuck to the conveyer in the oven, and the resulting pad had poor loft (about 30% less loft than a comparable pad coated with just urea-formaldehyde as a binder). The resulting pad was also very stiff, having little resiliency, so upon compression the pad lost porosity. This is highly undesirable, since, for shipping purposes, it is preferred to compress the pads to a certain degree; prior to use, the pads should expand back to the same, or to almost the same, loft.

EXPERIMENT 2

10 grams RHOPLEX TR-407 acrylic polymer emulsion and 40.0 grams urea-formaldehyde co-polymer blend were well mixed in a beaker. The mixture was spread onto a watch glass, and air dried for 2 days. A portion of the blend was cured for 3 minutes at 300° F. A 0.83 gram sample of the cured film was then placed in a pre-weighed empty tea bag and introduced into a 180° F. water bath for 1 hour. The tea bag was then removed from the water bath and dried, and the weight of the 20:80 blend of acrylic urea-formaldehyde blend was measured. The sample lost 0.65 grams of the blend, equivalent to a weight loss of 78.3%.

A 30:70 blend of acrylic urea-formaldehyde blend was treated in a similar fashion, and showed a weight loss of 42.1%.

EXPERIMENT 3

The following mixtures were formed:

| Ingredient | (Percentage by Weight) | | |
|---|---|---|---|
| | Sample 1 | Sample 2 | Sample 3 |
| Rohm and Haas RHOPLEX TR-407 | 25% | 30% | 35% |
| Seaco Urea-formaldehyde resin | 75% | 70% | 65% |

The ingredients for each of the samples were combined in 50 ml beakers and magnetically stirred for about 30 minutes at room temperature to homogenize the solutions. After mixing, the solutions were smeared on aluminum pans, and air dried for 2 days. The films were cured at 400° F. for 3 minutes. Portions of the cured samples were then put into pre-weighed tea bags, soaked in 180° F. water for 1 hour, dried on paper towels, and oven dried (for about 2 hours). Sample 1 lost about 27.4% by weight, Sample 2 lost about 22.7% by weight, and Sample 3 lost about 11.3% by weight.

EXPERIMENT 4

The same procedure as Experiment 3 was followed, except that in place of Rohm and Haas RHOPLEX TR-407 blend, Air Products Latex-984 blend was used as follows:

| Ingredient | (Percentage by Weight) | | |
|---|---|---|---|
| | Sample 4 | Sample 5 | Sample 6 |
| Air Products and Chemicals Latex-984 | 25% | 30% | 35% |
| Urea-formaldehyde | 75% | 70% | 65% |

Sample 4 lost about 31.2% by weight, Sample 5 lost 34.2% by weight, and Sample 3 lost 35.67% by weight.

EXPERIMENT 5

The procedure of Experiment 3 was followed, with Rohm and Haas RHOPLEX TR-407 being replaced with Roplex GL-618 as follows:

| Ingredient | (Percentage by Weight) | | |
|---|---|---|---|
| | Sample 7 | Sample 8 | Sample 9 |
| Rohm and Haas RHOPLEX GL-618 | 25% | 30% | 35% |
| Urea-formaldehyde | 75% | 70% | 65% |

Sample 7 lost 19.2% by weight, Sample 8 lost 22.6% by weight, and Sample 9 lost 12.5% by weight.

From the foregoing experiments, it was clear that, by increasing the quantity of acrylic polymer resin or emulsion added to the urea-formaldehyde co-polymer resin blend, that decreased water solubility resulted. Preferred results were achieved using the RHOPLEX TR-407 blended at 35% by weight to 65% by weight urea-formaldehyde (11.3% weight loss, or 88.7% durability). All of samples 1–9 showed significant durability, with a ratio of acrylic resin to urea-formaldehyde resin of 35/65 (35% acrylic resin to 65% urea-formaldehyde) having surprisingly good durability.

EXPERIMENT 6

A blend of 195 lbs urea-formaldehyde, "UF", and 105 lbs of RHOPLEX GL-618 "latex" was formed. An analysis of the UF-latex blend showed it to have a viscosity of 160 cps, a gel time of 7–9.2 minutes, and a percent solids of 56–60%. Note that the viscosity may be adjusted to optimize application to the glass fiber, preferably by spraying. Adjustment of the viscosity and other properties of the acrylic/UF resin blend can be achieved by conventional techniques, such as adjustment of the solids content, addition of soaps such as but not limited to sodium laurel sulfate, wetting agents such as but not limited to that sold by American Cyanamid under the tradename Deceresol OT, fillers such as clay, or foam stabilizers such as but not limited to ammonium stearate. The blend was then sprayed onto the glass fibers being wound onto a drum during hot melt spinning of a glass fiber mat. The mat was then cut off of the drum and pulled to expand its linear dimensions to approximately 40 times the original linear dimensions; the mat also vertically expanded to have increased loft.

The resulting pad was then fed to a 110 foot long oven at a speed of about 110 feet per minute. The oven was divided into first and second zones, with the first zone to which the mat was subjected being at 560° F. and the second zone being at 460° F. Mats of 2 inches through 4 inches in width (thickness or vertical height) were formed.

A second batch of latex/urea-formaldehyde blend was formed from 105 lbs RHOPLEX TR-407 and 195 lbs of urea-formaldehyde blend from Seaco. The resulting porous pad had an open structure on both sides. It was necessary to optimize the amount of latex urea-formaldehyde binder sprayed onto the mat material in order to optimize porosity. Pads were produced to minimize unwanted skin on the surfaces of the pads (a skin forms when the outer most portions of the pad are compressed to a greater degree than the inner most portions of the pad).

A pad produced according to the present invention was then compared to a polyester pad coated with an acrylic-polymer-based hydrophilic coating, and the results are presented below:

| | Media Properties Analysis | | | |
|---|---|---|---|---|
| | Fiber Glass | | Polyester | |
| Test Conducted | Dry | Wet | Dry | Wet |
| Air Flow Resistance (Pressure) 1000 CFM | 0.040 | 0.050 | 0.055 | 0.065 |
| Efficiency | | 77% | | 83% |
| Durability in 180° F. water | | 98% | | 98% |
| Water Retention | | >60% | | |
| Rate of Wetting by Water | 2 min/gal | | 3 min/gal | |
| Average Weight of 12 inch by 12 inch media | 25/5 | | | |
| Compression Recovery | 90% | | 70% | |
| Stiffness | V. high | | medium | |
| Porosity | 5–10μ | | 5–10μ | |

From the foregoing table it is clear that the hydrophilic fiber glass pads produced according to the present invention have excellent water wetting capabilities, improved stiffness in comparison to polyester pads, and excellent compression recovery. Of particular significance is that polyester media have a 30% greater air flow resistance when wet than the wet fiber glass media of the present invention. (For the purposes of this application, the term "coating formed of an amine-aldehyde blended with an acrylic," or the like can also be used to describe the cured coating, with it being understood that the cured coating may not contain any unreacted amine-aldehyde and/or acrylic.)

Additional experiments found that pads bound with a mixture of 25% by weight GL-618 to 75% by weight urea-formaldehyde had a better compressibility, but less durability, when compared to a blend formed of 35% by weight RHOPLEX TR-407 and 65% by weight urea-formaldehyde. However, the high recovery of both acrylic/UF coated pads is consistent with the physical properties of urea-formaldehyde resins, which have a modulus of elasticity of about 800 kg/mm$^2$ (in comparison to the modulus of elasticity for phenol formaldehyde blends of 250 kg/mm$^2$ and 900 kg/mm$^2$ for melamine-formaldehyde resins).

It is often helpful to produce mats of different color to distinguish mats having different properties or sources. This is accomplished by addition of dye to the binding/hydrophilic resin. In a preferred embodiment, dye compounds are combined with the urea-formaldehyde resin prior to mixing with the acrylic resin or emulsion composition.

In a preferred embodiment, following production of the fiber glass pad having a urea-formaldehyde/acrylic polymer binding/hydrophilic coating, the pad is then subjected to a second coating ("by foaming") with an acrylic or latex polymer and cured for additional hydrophilicity. The second coating with the additional hydrophilic coating is also believed to result in increased durability of the pad when in contact with water. Preferably, the second coating is cured at about 300° F. The resulting cooler media has great hydrophilicity, and has much larger porosity (a minimum average porosity of greater than 20 microns) than prior art polyester cooler pads (porosity less than or equal to 10 microns), and the hydrophilic glass fiber mats formed of the media are less susceptible to degradation and have greater dimensional stability than the prior art polyester mats. Conventional acrylic emulsion foaming procedures used with polyester pads can also be used with acrylic/urea-formaldehyde coated porous, glass fiber pads of the present invention. In a preferred embodiment the acrylic emulsion is modified to include wetting agents, soap (foam stabilizer), and other conventional additives which enhance the ability of the acrylic to be applied and to adhere to the precoated glass fiber. Note that these additional ingredients are optional and the determination of the amounts to add is well within the skill of one of ordinary skill in the art. A preferred non-limiting example of a foaming mixture is formed of:

| Ingredient | Quantity | |
|---|---|---|
| Water | 25 gal | |
| Deceresol OT | 1.5 gal | foam stabilizer from American Cyanamid |
| Tamol 850 | 2.1 qts | self-cross linking acrylic emulsion from Rohm & Haas |
| E-32 | 12.0 gal | acrylic emulsion with glass transition temperature of 0° C. from Rohm & Haas; improves flexibility of resulting cured coating |
| A-18 | 3.0 qts | wetting agent and/or foam stabilizer from American Cyanamid |
| Siflo Clay | 2.0 bags (50 lbs each) | filler from Nord Terlite Company of Dayton, Ohio |
| Ammonium Stearate | 5.50 gal | foaming agent (soap) |
| TR-407 | 48 gal | acrylic emulsion from Rohm & Haas |

At present, the cost for urea-formaldehyde blends is approximately ⅓ to ¼ that of the cost of acrylic resin blends. Therefore, it is desired to maximize the utilization of urea-formaldehyde in comparison to the acrylic resin used, while at the same time using sufficient acrylic resin to ensure sufficient hydrophilicity and durability of the pads produced.

As the present invention pioneers the use of hydrophilic glass fibers, and hydrophilic glass fiber pads, especially for use in evaporative cooler apparatus, it is envisioned that a wide range of compounds can be used to produce the binding/hydrophilic coating on the glass fibers to ensure that the glass fibers are bound sufficiently to maintain the high dimensional stability of the glass fiber pads while having high hydrophilicity and good durability when in contact with water. For example, amine containing compounds other than urea can be combined with an aldehyde and an acrylic to produce a binder; non-limiting examples include melamine formaldehyde, and the urea-formaldehyde discussed above. It is also believed possible to utilize phenol-formaldehyde blends with acrylic resins. However, urea-formaldehyde is preferred since it decays to form amine salts, and certain insects are known to eat cured urea-formaldehyde blends with no harmful effects. On the other hand, phenol-formaldehyde co-polymer blends are believed to be toxic in certain instances, as are melamine-formaldehyde blends.

Other contemplated equivalents to the urea-formaldehyde blend include modified isocyanate/dicarboxylic acid blends, or compounds capable of acting as binders and hydrophilic coatings in accordance with the objects of the invention, e.g., bind glass fibers into a stable 3-dimensional pad without interfering with the hydrophilicity of the resulting coating, and yet not rapidly degrade/dissolve when contacted with water.

Contemplated equivalents of the acrylic or latex blend encompass blends include any member of the acrylic acid family which is capable alone, or in combination with a synthetic or natural rubber compound, of having the necessary durability and hydrophilicity for effective use in glass fiber evaporative cooler media. Hence, amine-aldehyde refers to any blend of an amine containing monomer, oligomer, or polymer with an aldehyde containing monomer, oligomer or polymer. By members of the acrylic acid family, it is meant any alpha-beta unsaturated carboxylic acid or alpha-beta unsaturated ester, provided the composition will react alone (or when combined with another latex compound or a latex like compound) with an amine-aldehyde to form a dimensionally stable hydrophilic glass fiber media. Acrylic resins are also contemplated to include substances such as isoprene and other natural and/or synthetic latex like compounds provided they are hydrophilic, have good wet strength, and can adequately bind glass fibers when combined with an amine-aldehyde.

From the foregoing, it is clear that a preferred binder/ hydrophilic blend can be formed of from between 5% and 50% of an acrylic (monomer, oligomer or polymer) combined with 50–95% of a urea-formaldehyde resin, to which can also be added dyes and other processing aids depending on the user requirements. In a preferred process, an amine-aldehyde acrylic resin blend is sprayed onto glass fiber and spun into a glass fiber mat by hot melt spinning. The resulting coated mats are then drawn to produce an expanded porous glass fiber pad, which is cured at temperatures between 250° F. and 600° F. Preferably, the curing is done in a two step process, with a first curing step performed at temperatures of approximately 415° F. for periods of time ranging from 15 seconds to 5 minutes, and a second curing step performed at temperatures of 515° F. for 15 seconds to 5 minutes. In the alternative, curing can occur at temperatures ranging between 460° F.–550° F. for a time ranging from 15 seconds to 5 minutes. Of course, longer or shorter curing times may be used at lower, higher, or equivalent temperatures, depending on the processing facilities available, the thickness of the mat, and the speed at which the mat is conveyed through an oven, and other process variables as would be obvious to one of skill in the art without requiring undue experimentation.

In a preferred embodiment, a porous fiber glass pad having a hydrophilic amine-aldehyde/acrylic coating produced in accordance with the present invention is cut to a size sufficient for placement inside of an evaporative cooler apparatus, such as that shown in FIG. 1. Due to the improved dimensional stability of the mat, the number of reinforcement structures in the grids may be reduced or eliminated entirely depending upon the size of the pad, and the operating conditions. An evaporative cooler apparatus constructed in accordance with the present invention will require less frequent replacement of the cooler pad(s) as a result of the improved dimensional stability of the glass fiber pads and decreased clogging of the pads due to the increased porosity. Further, blower motors will be subjected to less wear due to the decreased pressure drop through the glass fibers pads produced according to the present invention, thus extending blower life, or allowing for the use of less powerful and more energy efficient blowers.

Although it is believed that the amine-aldehyde resin and the acrylic resin undergo cross-linking during curing to form a water-stable hydrophilic binder for the porous, glass fiber pads of the present invention, the invention is not to be limited by any particular theory or mechanism of operation for the hydrophilic coatings formed. If it is further contemplated that an equivalent process may involve application (e.g., by "foaming") of an acrylic emulsion to a porous glass fiber pad, bound or dimensionally stabilized by a conventional binder, such as a urea-formaldehyde resin, to form a hydrophilic, dimensionally stable, porous glass fiber pads, although it is believed that such a process can not achieve the exact results possible following the preferred process.

Thus, the present invention discloses new hydrophilic coated glass fibers, and dimensionally stable, hydrophilic glass fiber pads, processes for producing same, as well as an apparatus and a method for utilizing the hydrophilic glass fiber pads of the present invention to cool air. From the above teachings, it is apparent that many modifications and variations of the present pioneer invention are possible. It is therefore to be understood that the invention may be practiced otherwise than as it is specifically described above.

I claim:

1. A process for improving the water wicking capacity of glass fiber fabricated for use in evaporative cooler media comprising coating said fiber with a blend of an amine-aldehyde and an acrylic, and curing said coating on said fiber by exposure to heat.

2. The process of claim 1, wherein said curing temperature is between 200° F. and 600° F.

3. The process of claim 1, wherein said curing temperature is between 460° F. and 560° F. and said curing occurs for a time ranging from 15 seconds to 5 minutes.

4. The process of claim 1, wherein said coating comprises from about 5 weight % to about 50 weight % to about 95 weight % of a urea-formaldehyde.

5. The process of claim 1, wherein said coating comprises from about 25 to about 35 weight % of an acrylic resin and from about 65 to about 75 weight % of a urea-formaldehyde resin.

6. A process for producing coated glass fiber for use inevaporative cooler media comprising the step of coating glass fiber with a blend of an amine-aldehyde and an acrylic blended such that said coating increases the water wetting capabilities of the glass fiber relative to uncoated glass fiber.

* * * * *